United States Patent [19]

Mathews

[11] Patent Number: 4,889,173

[45] Date of Patent: Dec. 26, 1989

[54] TIRE REINFORCING COMPONENT

[75] Inventor: Derek Mathews, St. Helens, United Kingdom

[73] Assignee: Apsley Metals Limited, United Kingdom

[21] Appl. No.: 128,159

[22] Filed: Dec. 3, 1987

[30] Foreign Application Priority Data

Dec. 3, 1986 [GB] United Kingdom ............... 8628976

[51] Int. Cl.$^4$ ................................................ B60C 9/26
[52] U.S. Cl. ................................. 152/528; 152/533; 428/295
[58] Field of Search ............... 152/528, 530, 533, 563, 152/538, 560; 156/117; 428/108, 295

[56] References Cited

U.S. PATENT DOCUMENTS

| 3,018,814 | 1/1982 | Saint-Paul | 152/528 X |
| 3,973,613 | 8/1976 | Marzocchi et al. | 152/528 |
| 4,399,187 | 8/1983 | Holroyd et al. | 152/533 X |
| 4,409,059 | 10/1983 | Holroyd et al. | 152/533 X |

FOREIGN PATENT DOCUMENTS

| 1100931 | 3/1961 | Fed. Rep. of Germany | 152/533 |
| 1480943 | 2/1962 | Fed. Rep. of Germany | 152/528 |
| 2118748 | 11/1972 | Fed. Rep. of Germany . | |
| 2224434 | 12/1973 | Fed. Rep. of Germany . | |
| 55-08926 | 1/1980 | Japan | 152/528 |

*Primary Examiner*—Raymond Hoch
*Attorney, Agent, or Firm*—Stevens, Davis, Miller & Mosher

[57] ABSTRACT

A tire reinforcing component, preferably a breaker for a radial tire, is formed from an elastomeric ply reinforced by a single continuous cord (7) which extends back and forth from edge (14) to edge (15) across the ply in a zig-zag formation in which traverses (8) (9) of the cord are parallel to each other, and a series of loops (10) (11) is formed at each edge. The ply has its edge margins (12) (13) folded inwards so that the looped edges (14) (15) lie adjacent the centerline (X—X) of the ply.

A breaker of this construction is arranged preferably so that the looped edges (10) (12) are located on the radially inner side of the breaker.

8 Claims, 2 Drawing Sheets

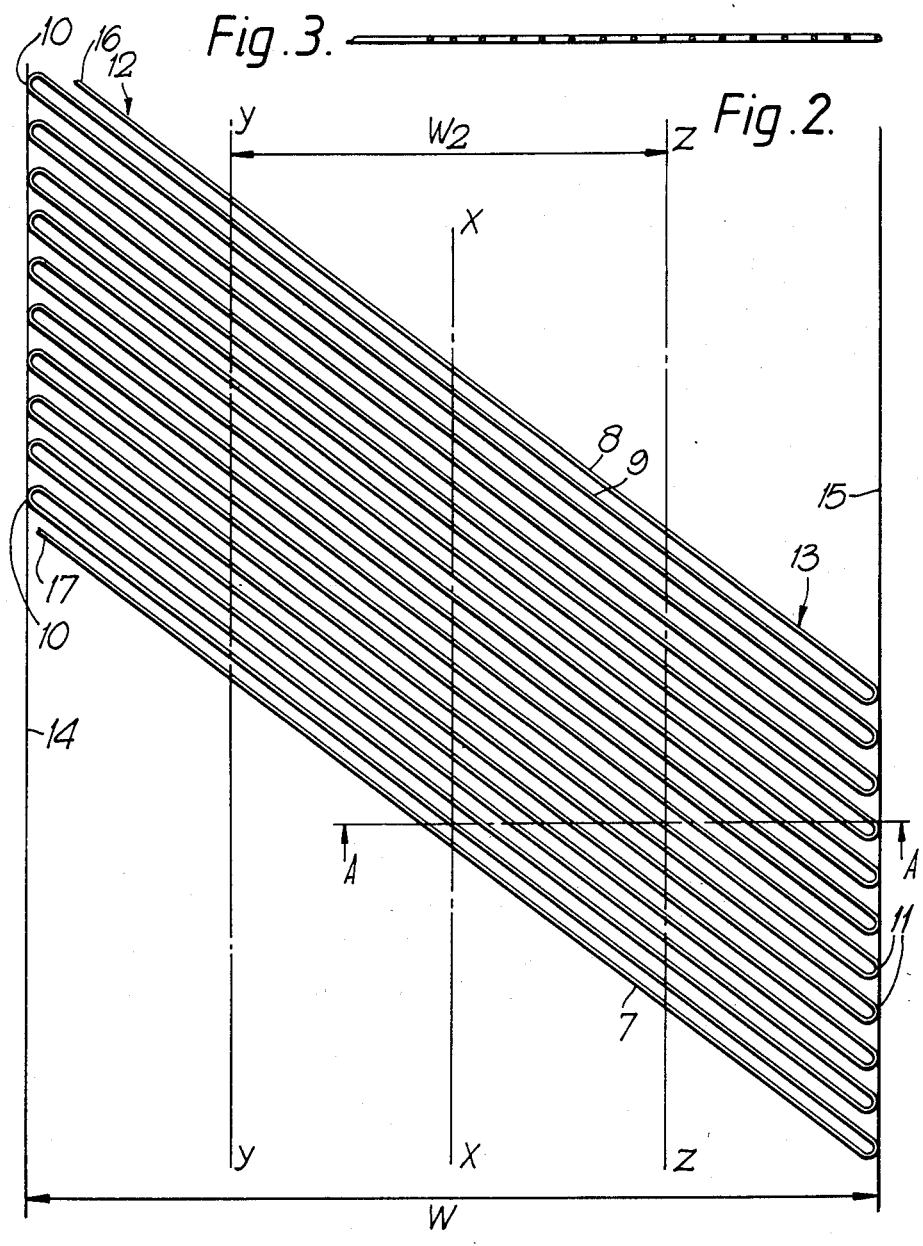
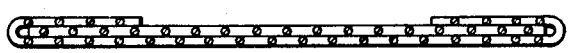

TIRE REINFORCING COMPONENT

This invention relates to reinforcing components for tires and in particular breakers used to reinforce the crown region of a radial carcass tire.

A tire breaker conventionally comprises one or more layers of plies of adjacent parallel cords extending across the width of the tread usually with the cords at an acute angle to the circumferentially extending center-line of the tread. The edges of the breaker plies are sometimes formed by the adjacent cut ends of the cords and these cut edges are often the source of weaknesses in tires which lead to failure. The weaknesses are due to the failure of the bond between the cords and the remainder of the tire initiated by the cut ends of the cord filaments. This is especially noticeable in the case of steel cords.

The above problem becomes more serious in tires having high speed ratings e.g. "h" or "v" rating tires. One breaker construction, which has been developed to avoid the above problem in "h" or "v" rated tires, is to fold the edges of the breaker plies axially inwards so that the axial edges of the breaker assembly are formed as folds. A typical example is illustrated in FIG. 1. The breaker assembly comprises the plies of reinforced steel cords, one ply being much wider than the other. The edges of the wider ply are folded axially inwards so as to lie a short distance inwards of the side of the breaker assembly. The cut edges of the narrower ply are covered by the wider ply. However, such assemblies are expensive, place other restrictions on the breaker design and manufacture and can modify the performance of the tire since, as can be seen in FIG. 1, the stiffness at the sides of the breaker assembly where there are three layers is greater in comparison to the central portion where there are only two layers.

The folded breaker construction of two steel cord reinforced plies is often provided with an overlay ply of polyamide cords which extend parallel to the circumference of the tire. The steel cords, referred to above, extend at acute angles to the circumferential line.

It is an object of the present invention to provide an alternative rubberized reinforcing component having the necessary physical properties, is relatively simple to manufacture and when used as a breaker for a tire is less likely to cause internal damage in the tire tread at the edges of the breaker.

In accordance with the invention there is provided a tire reinforcing component formed from a ply of elastomeric material reinforced by a single continuous cord which extends back and forth from edge to edge across the width of the ply in a zig-zag formation in which the portions of the cord traversing the ply are substantially parallel to each other and the edges of the ply are formed with a plurality of loops, characterized in that the edge margins of the ply are folded inwards so that the looped edges lie adjacent the longitudinal centerline of the ply.

Preferably the two ends of the cord are positioned away from the imaginary lines which form the two sides of the component.

When the component is used to reinforce the crown region of a pneumatic tire, i.e. is used as a breaker, the two edges of the ply which are now positioned substantially along the centerline of the component are preferably positioned on the radially inward side. That is radially with respect to the axis of rotation of the respective tire.

The cords preferably comprise a twisted package of high modulus filament materials having a modulus of 5000 to 21000 Kg/mm$^2$, for example steel, glass fibre or aromatic polyamide (e.g. Flexten, Registered Trade Mark).

The cord is preferably laid so that adjacent lengths traversing the ply are separated by a distance which is less than 1.2 times the cord diameter and greater than 0.2 times the cord diameter.

The cords may extend 90° to the longitudinal centerline of the component but may also be at an acute angle to the centerline. When the component is used as a breaker a preferred angle lies in the range 15° to 30°.

Preferably each cord loop is arranged so that each filament in the cord in approximately under similar conditions of bend radius and loading, the bend radius being measured with respective to an imaginary axis which lies at right angles to the ply.

Preferably also the cord is of multi-filament construction having relatively low twist angle which provides a construction in which the filaments support each other against buckling in the tire under service conditions but during formation of the loop of the play edges during manufacture of the filaments move so as to approach a formation which allows bending without generation of high stresses which would lead to fatigue failure in use.

One example of the present invention will now be described with reference to the accompanying drawings of which:

FIG. 1 shows a prior art breaker assembly;

FIG. 2 shows a single ply in plan view in the unfolded condition;

FIG. 3 shows a cross-section on line A—A of FIG. 1;

Figure 4:
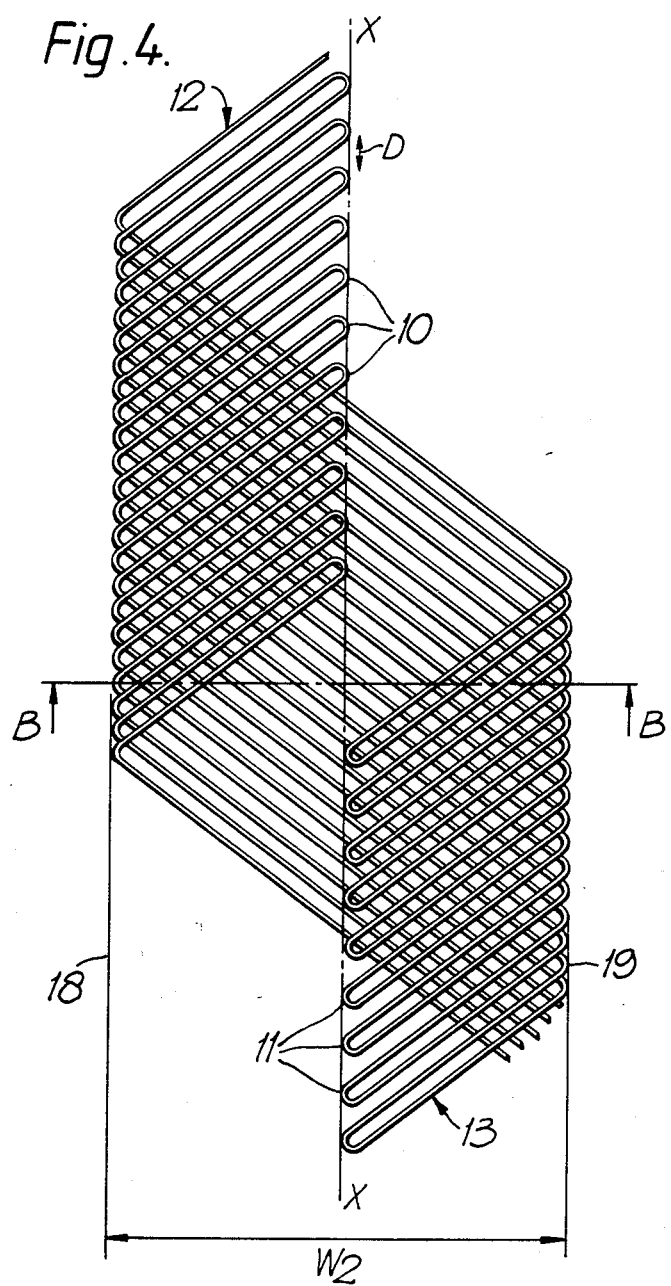
FIG. 4 shows the ply of FIG. 2 folded so that its looped edges lie on the centerline.

The reinforcing component shown in FIGS. 2 to 5 comprises a breaker assembly for a radial carcass pneumatic tire, preferably an automobile tire. As shown in FIGS. 2 and 3 the ply comprises an elongated sheet of elastomeric material reinforced by a single reinforcement cord 7 which extends back and forth across the ply in zig-zag configuration. The portions of cord traversing the ply are substantially parallel to each other and each traversing length 8, 9 of the cord extends from one edge 14 of the ply to the other edge 15 at an angle of between 15° to 30° to the centerline x—x and preferably at an angle of approximately 21°. The cord preferably comprises brass-plated steel filaments twisted with a twist angle of less than 18° and preferably about 7°. Thus, the single cord is laid in zig-zag configuration with successive traversing lengths lying parallel to and adjacent to one another with a gap between adjacent lengths of between 0.2 to 1.2 times the cord diameter, and preferably about 0.25 times the cord diameter. At the edges 14 and 15 of the ply a series of loops 10, 11 in the cord is formed.

Figure 5:
FIG. 5 shows a cross-section on the line B—B of FIG. 4.

It will be appreciated that the width 'w' of the ply between the two edges 14 and 15 is approximately twice the width W2 required for a required breaker assembly which is formed as can be seen in FIGS. 4 and 5 by folding the edge margins 12 and 13 of the ply inwards about imaginary lines y—y and z—z each parallel to the centerline x—x of the ply and spaced therefrom by one quarter of the total width of the ply. The looped edges 14 and 15 of the ply lie adjacent the longitudinal centerline x—x of the ply. Preferably the edge margins 12 and 13 are folded so that they both lie on the same side of the ply. Alternatively they could be folded to lie on opposite sides of the ply. When the edge margins are on the same side of the ply the loops 10, 11 formed in the cord at the play edges 14 and 15 then lie very close to one another almost in abutment, adjacent the longitudinal centreline x—x of the ply but do not touch so as to avoid any damage caused by one loop from one edge 14 rubbing against a loop from the other edge 15.

The two ends 16 and 17 (see FIG. 2) of the single cord which form the whole structure are arranged so as to lie away from the folded edges 18 and 19 of the component.

It will be appreciated that in essence the breaker assembly just described comprises two reinforcing layers, one comprising cord lengths extending at an acute angle to the centreline, with the other layer comprising cord lengths extending at the same cord angle to the centreline but in the opposite sense. This is approximately equivalent to the standard two-ply breaker comprising two ply cords having cut ends. However, the whole advantage of this structure is that there are no cut ends other than the two ends of the single cord which can be positioned where the least internal damage will be caused.

The component just described and illustrated in FIGS. 4 and 5 is considered suitable for reinforcing "S" rated radial ply tires. If, however, it is intended to be used to reinforce an "h" or "v" rated radial tire, then it may be necessary to use the breaker in conjunction with other plies or with one or more similar assemblies and/or a ply of polyamide cords extending parallel to the centerline.

Furthermore, when the edge margins 12 and 13 are folded axially inwardly, then it will be possible to alter the angle of bias of the cords in the edge margin, in comparison with the remainder of the breaker by displacing the edges 14 15 indicated by D in FIG. 4 relative to the centerline x—x of the ply during the folding operation. For example, the cords in the play are arranged at approximately 21°, and when the edge margins 12 and 13 are turned inwards, the edges 14 and 15 can be displaced to increase and decrease the angle of the cords in the folded portion relative to the centerline x—x by up to ±3° as desired. While it is considered that both edge margins would be displaced in such a manner that they have the same final cord angles, it is possible that each edge margin (12) or (13) could be formed to a different cord angle thereby giving slightly different physical characteristics to each side of the belt.

I claim:

1. A tire reinforcing component formed from a ply having a pair of edges and a longitudinal centerline, the ply comprising elastomeric material reinforced by a single continuous cord which extends back and forth from edge to edge across the width of the ply in a zigzag formation in which the portions of the cord traversing the play are substantially parallel to each other and the edges of the ply are formed with a plurality of loops, the edge margins of the ply being folded inwards back onto the ply so that the looped edges lie adjacent the longitudinal centerline of the ply, and the axially inner edge of at least one of said edge margins being displaced longitudinally relative to said centerline of the ply so that the bias angle made by the traversing cords relative to said centerline is different for those traversing cords in said one folded edge margin, than for the bias angle of those cords in other portions of the ply.

2. A tire reinforcing component as claimed in claim 10 in which the two edge margins are both folded inwards to lie on the same side of the ply with the two looped edges substantially in abutment but being spaced so as to avoid touching each other.

3. A tire reinforcing component as claimed in claim 2 wherein the ends of the single continuous cord are located in the inwardly folded edge margins of the ply.

4. A tire reinforcing component as claimed in claim 1 wherein the axially inner edges of both edge margins are each displaced relative to said centerline of the ply.

5. A tire reinforcing component as claimed in claim 10 wherein both axially inner edges of both edge margins are each displaced longitudinally relative to said centerline of the ply so that the cord traverses in both folded edge margins make substantially the same bias angle with the longitudinal centerline of the ply.

6. A radial ply tire having a breaker formed from a component as claimed in claim 10.

7. A radial ply tire having a breaker formed from a component as claimed in claim 2, wherein the breaker is arranged with the looped edges located on the radially inner side of the breaker.

8. A radial ply tire having a breaker formed from a component as claimed in claim 10, wherein the cord traverses the ply at an angle of between 15° to 30° to the longitudingal centerline of the ply.

* * * * *